United States Patent [19]

Fox et al.

[11] 4,197,370

[45] Apr. 8, 1980

[54] FOAMABLE POLYPHENYLENE OXIDE COMPOSITION WITH THERMALLY UNSTABLE COPOLYMER AS FOAMING AGENT

[75] Inventors: Daniel W. Fox, Pittsfield; John C. Goossens, Dalton, both of Mass.

[73] Assignee: General Electric Company, Pittsfield, Mass.

[21] Appl. No.: 754,224

[22] Filed: Dec. 27, 1976

[51] Int. Cl.² ............................................. C08J 9/04
[52] U.S. Cl. .................................. 521/77; 260/42; 260/45.75 B; 260/45.7 P; 260/45.8 N; 525/132; 525/146; 525/148; 521/180
[58] Field of Search ............... 260/2.5 R, 874, 2.5 D; 526/318, 324; 521/77, 180

[56] References Cited

U.S. PATENT DOCUMENTS

| | | | |
|---|---|---|---|
| 2,798,062 | 7/1957 | Contois | 526/318 |
| 2,866,771 | 12/1958 | Sellers | 526/318 |
| 3,306,874 | 2/1967 | Hay | 528/219 |
| 3,306,875 | 2/1967 | Hay | 528/219 |
| 3,342,892 | 9/1967 | Laakso et al. | 260/860 |
| 3,388,106 | 6/1968 | Muskat | 526/318 |
| 3,442,829 | 5/1969 | Moore et al. | 521/180 |
| 3,492,249 | 1/1970 | Pezarro et al. | 521/180 |
| 3,547,898 | 12/1970 | Shapiro | 526/318 |
| 3,862,263 | 1/1975 | Maruta et al. | 260/874 |
| 3,956,242 | 5/1976 | Olander | 528/219 |

OTHER PUBLICATIONS

Journal of Applied Polymer Science, vol. 17, pp. 3651–3660 (1973), Mizutani et al.

*Primary Examiner*—Harold D. Anderson
*Attorney, Agent, or Firm*—Morgan, Finnegan, Pine, Foley & Lee

[57] ABSTRACT

Novel foamable compositions are disclosed which may comprise a polyphenylene oxide resin with or without an alkenyl aromatic resin; and a foaming agent which is a thermally unstable copolymer.

15 Claims, No Drawings

FOAMABLE POLYPHENYLENE OXIDE COMPOSITION WITH THERMALLY UNSTABLE COPOLYMER AS FOAMING AGENT

This invention provides a foamable composition which may comprise a polyphenylene oxide resin alone or in combination with an alkenyl aromatic resin; and a foaming agent which is a thermally unstable copolymer.

BACKGROUND OF THE INVENTION

The polyphenylene oxide resins are a well known family of engineering thermoplastics that are well known to the polymer art. These polymers may be made by a variety of catalytic and non-catalytic processes from the corresponding phenols or reactive derivatives thereof. By way of illustration, certain of the polyphenylene oxides are disclosed in Hay, U.S. Pat. Nos. 3,306,874 and 3,306,875, and in Stamatoff, U.S. Pat. Nos. 3,257,357 and 3,257,358. In the Hay patents, the polyphenylene oxides are prepared by an oxidative coupling reaction comprising passing an oxygen-containing gas through a reaction solution of a phenol and a metal-amine complex catalyst. Other disclosures relating to processes for preparing polyphenylene oxide resins, including graft copolymers of polyphenylene oxides with styrene type compounds, are found in Fox, U.S. Pat. No. 3,356,761; Sumitomo, U.K. No. 1,291,609; Bussink et al, U.S. Pat. Nos. 3,337,499; Blanchard et al, 3,219,626; Laakso et al, 3,342,892; Borman, 3,344,116; Hori et al, 3,384,619; Faurote et al, 3,440,219; Olander 3,956,242; and disclosures relating to metal based catalysts which do not include amines, are known from patents such as Wieden et al, U.S. Pat. Nos. 3,442,885 (copper-amidines); Nakashio et al, 3,573,257 (metal-alcoholate or-phenolate); Kobayashi et al, 3,455,880 (cobalt chelates); and the like. In the Stamatoff patents, the polyphenylene oxides are produced by reacting the corresponding phenolate ion with an initiator, such as peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. Nos. 3,382,212. Cizek, 3,383,435 discloses polyphenylene oxide styrene resin compositions. All of the above-mentioned disclosures are incorporated by reference.

One of the outstanding properties of the polyphenylene oxide resins is the property of high-heat resistance which makes possible the use of this resin in applications where many thermoplastics would fail. This exceptional property, while desirable in a finished article, causes problems when melt blending is used to form compositions that include the polyphenylene ether resins. One problem is related to the fact that the high temperatures required for the processing of the polyphenylene ethers approach the temperatures at which additives begin to degrade. This problem is especially serious when compositions are formulated which include chemical foaming agents that are added to make a foamable thermoplastic composition as the temperatures at which the polyphenylene oxides are processed are sufficient to activate most thermolabile blowing agents. In addition, the decomposition products that result from the breakdown of the chemical blowing agent may be incompatible with the polyphenylene oxide polymer and may adversly affect the chemical stability and the physical properties of these compositions.

The applicants have discovered that foamable polyphenylene oxide compositions may be prepared by the use of a thermally unstable copolymer of a vinyl aromatic resin and a monoalkyl ester of an unsaturated dicarboxylic acid. It has been found that this type of a foaming agent may be extrusion blended at temperatures of about 450° F. without inducing thermal decomposition. Injection molding at about 540°–560° F. is sufficient to cause decomposition of the foaming agent which expands the polyphenylene oxide composition. In addition it has also been found that these foaming agents may be coated onto pelletized polyphenylene oxide compositions and the resulting compositions may be foamed directly without having to extrusion blend the foamable composition.

Mizutani et al, J. Appl. Polym. Sci. Vol. 17, pp 3651–3660 (1973) describe a foaming agent which is a fine powdery crosslinked terpolymer of styrene, divinylbenzene and a monoalkylmaleate. This foaming agent is reported as having a decomposition temperature which results in foaming when the composition is extruded at 165°–175° C. This reference only mentions crosslinked terpolymers and does not suggest that an uncrosslinked binary copolymer, may be employed as a foaming agent for polyphenylene oxides.

Accordingly, it is a primary object of this invention to provide novel foamable compositions of polyphenylene oxide resins that have a sufficiently high thermal stability which will permit extrusion blending without thermal decomposition of the foaming agent.

It is also an object of this invention to provide a foamable polyphenylene oxide composition without extrusion blending the foaming agent with the resinous components of the composition.

DETAILED DESCRIPTION OF THE INVENTION

The novel polyphenylene oxide compositions comprise:

(a) a polyphenylene oxide resin or a polyphenylene oxide resin and an alkenyl aromatic resin; and (b) a minor amount of a foaming agent which comprises a thermally unstable copolymer containing units of the formula:

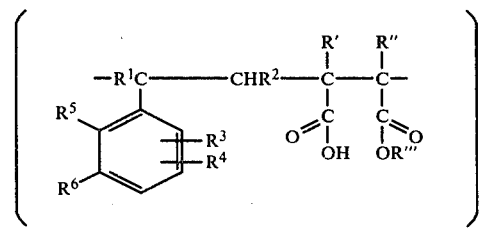

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and lower alkenyl groups of from 1 to 6 carbon atoms; or $R^5$ and $R^6$ may be concatenated together with hydrocarbyl groups to form a naphthyl group, said units being free of any substituent having a tertiary carbon atom; $R'$ and $R''$ are independently selected from the group consisting of hydrogen, lower alkyl of from 1 to 6 carbon atoms and phenyl; and R'''
is lower alkyl of from 1 to 6 carbon atoms.

Examples of the foaming agent include the methyl, ethyl, isopropyl, isobutyl, secondary butyl and isoamyl half esters of styrene-maleic anhydride copolymers.

The foaming agent may be prepared by esterification of a copolymer of an alkenyl aromatic monomer and an unsaturated dicarboxylic acid anhydride or it may be prepared by copolymerizing an alkenyl aromatic monomer with a half ester of an anhydride of an unsaturated dicarboxylic acid.

The polyphenylene oxide resins are preferably those having units of the formula:

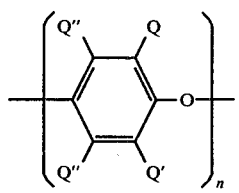

wherein Q is a monovalent substituent selected from the group consisting of hydrocarbon radicals, halohydrocarbon radicals having at least two carbon atoms between the halogen atoms and the phenol nucleus, hydrocarbonoxy radicals and halohydrocarbonoxy radicals having at least two carbon atoms between the halogen atom and the phenol nucleus; and Q' is as defined for Q and in addition may be halogen and Q" are each as defined for Q' and in addition may be hydrogen, with the proviso that Q, Q' and Q" are all free of a tertiary carbon atom; and n is at least 50.

The preferred polyphenylene oxide resin is poly (2,6-dimethyl-1,4-phenylene oxide) having an intrinsic viscosity of about 0.45 dl/g as measured in chloroform at 30° C.

The term alkenyl aromatic monomer as used herein describes a compound of the formula:

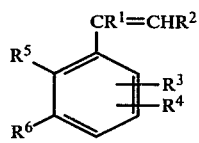

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ and selected from the group consisting of hydrogen and lower alkyl and lower alkenyl groups of from 1 to 6 carbon atoms; or $R^5$ and $R^6$ may be concatenated together with hydrocarbyl groups to form a naphthyl group, said compounds being free of any substituent having a tertiary carbon atom.

As used herein the term anhydride of an unsaturated dicarboxylic acid is used to describe compounds having the general formula:

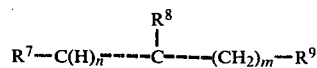

wherein the dotted lines represent either a single or a double carbon to carbon bond with the proviso that, $R^7$ and $R^8$ taken together represent a

linkage, $R^9$ is selected from the group consisting of hydrogen, vinyl, alkyl of from 1-12 carbon atoms, alkenyl of from 1-12 carbon atoms, alkylcarboxylic of from 1-12 carbon atoms or alkenylcarboxylic of from 1-12 carbon atoms, n is 1 or 2, depending on the position of the carbon-carbon double bond, and m is an integer of from 0 to about 10. Examples include maleic anhydride, citraconic anhydride, itaconic anhydride, aconitic anhydride, and the like.

The alkenyl aromatic resins include by way of example, homopolymers such as homopolystyrene and polymonochlorostyrene, the modified polystyrenes, such as rubber-modified, high impact polystyrene and the styrene-containing copolymers, such as the styrene acrylonitrile-α-alkyl styrene copolymers, styrene-acrylonitrile copolymers, styrene butadiene copolymers, styrene-acrylonitrile butadiene copolymers, polymethylstyrene, copolymers of ethyl vinyl benzene, divinylbenzene and styrene maleic anhydride copolymers and block copolymers of styrene-butadiene and styrene-butadiene-styrene or hydrogenated derivatives thereof.

The styrene-maleic anhydride copolymers are described in U.S. Pat. Nos. 2,971,939; 3,336,267 and 2,769,804 which are hereby incorporated by reference.

The preferred alkenyl aromatic resins are the rubber-modified high-impact styrene resins and these may be made by well known procedures with rubbers such as nitrile rubbers, polybutadiene rubber, styrene-butadiene rubber, polysulfide rubber, ethylene propylene copolymers, propylene oxide and EPDM. These materials are well known and many are commercially available. A preferred rubber-modified, high-impact styrene resin is commercially available as FG-834. This product contains about 8% polybutadiene rubber.

The compositions of the invention may comprise from 5-80 parts by weight and more preferably from 10 to 40 parts by weight of the polyphenylene oxide resin; from 0-70 parts by weight and more preferably from 10-70 parts by weight or most preferably from 30-60 parts by weight of an alkenyl aromatic resin; and from 10-30 parts by weight and more preferably from 2-20 parts by weight of the foaming agent based on the total weight of the composition.

The compositions may also include from 3 to 5 parts by weight of a thermoplastic elastomer such as an A-B-A block copolymer which may or may not be hydrogenated. Examples of these materials include styrene butadiene-styrene block copolymers which if hydrogenated will have their residual unsaturation reduced to less than 10%. These materials are described in U.S. Pat. Nos. 3,251,905; 3,231,635; and 3,431,303, all of which are incorporated by reference.

The foaming agent may be prepared from thermally unstable half esters of a copolymer of from 50-90 mole percent alkenyl aromatic monomer and from 50-10 mole percent of an unsaturated acid anhydride.

The composition may also include a reinforcing filler or agent. As reinforcing fillers, there may be employed reinforcing amounts of reinforcing filler. In general, any reinforcement can be used, e.g. aluminum, iron or nickel, and the like, and non-metals, e.g. carbon filaments, silicates, such as acicular calcium silicate, asbestos, TiO₂, potassium titanate and titanate whiskers, wollastonite, glass flakes and fibers and the like. It is to be understood that, unless the filler adds to the strength and stiffness of the composition, it is only a filler and not a reinforcing filler as contemplated herein. In particular, the reinforcing fillers increase the flexural strength, the flexural modulus, the tensile strength and the heat distortion temperature.

Although it is only necessary to have at least a reinforcing amount of the reinforcement present, in general, the combination of components (a) and (b) will comprise from about 10 to about 90 parts by weight and the filler will comprise from about 10 to about 90 parts by weight of the total composition.

In particular, the preferred reinforcing fillers are of glass and it is preferred to use fibrous glass filaments comprised of lime-aluminum borosilicate glass that is relatively soda free. This is known as "E" glass. However, other glasses are useful where electrical properties are not so important, e.g. the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.000112 to 0.00075 inch, but this is not critical to the present invention.

In general, best properties will be obtained if the sized filamentous glass reinforcement comprises from about 1 to about 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present without causing flow problems. However, it is useful also to prepare the compositions containing substantially greater quantities, e.g., up to 70-80% by weight of glass. These concentrations can then be custom blended with blends of resins that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛ inch to about 1 inch long, preferably less than ¼ inch long. In articles molded from the compositions, on the other hand, even shorter lengths will be encountered because, during compounding, considerable fragmentation will occur.

Because it has been found that certain commonly used flammable sizings on the glass, e.g. dextrinized starch or synthetic polymers, contribute flammability often in greater proportion than expected from the amount present, it is preferred to use lightly sized or unsized glass reinforcements in those compositions of the present invention which are flame retardant. Sizings, if present, can readily be removed by heat cleaning or other techniques well known to those skilled in the art.

The foaming agent may be prepared as a fine powder or as a solution and a molding powder may be prepared by powder coating the polyphenylene oxide resin composition or by solution blending the foaming agent with a solution of the polyphenylene ether resin composition. The compositions may be prepared by melt blending the ingredients in an extruder at a temperature below the decomposition point of the blowing agent.

The composition may be employed for making various molded articles having diverse applications. If desired the compositions having low amounts of the foaming agent may be employed to prevent shrinking of large molded articles during molding operations.

The molding compositions may also include one or more flame retardant amounts of flame retardant agents that impart varying degrees of flame retardant properties to the compositions.

Useful thermally unstable ester containing copolymers of an alkenyl aromatic monomer and the unsaturated acid should have an intrinsic viscosity of between about 0.1 and about 1.0 dl/g as measured in tetrahydrofuran at 30° C.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds or a mixture of two or more of the foregoing.

The amount of flame-retardant additive used is not critical to the invention, so long as it is present in a minor proportion based on said composition—major proportions will detract from physical properties—but at least sufficient to render the polyester composition non-burning or self-extinguishing. Those skilled in the art are well aware that the amount will vary with the nature of the polymers in the blend and with the efficiency of the additive. In general, however, the amount of additive will be from 0.5 to 50 parts by weight per hundred parts of the resinous components. A preferred range will be from about 3 to 25 parts and an especially preferred range will be from about 5 to 15 parts of additive per 100 parts of the resinous components. Smaller amounts of compounds highly concentrated in the elements responsible for flame-retardance will be sufficient, e.g., elemental red phosphorus will be preferred at 0.5 to 10 parts by weight space per hundred parts of the resinous components while phosphorus in the form of triphenyl phosphate will be used at 5 to 25 parts of phosphate per part of resinous components and so forth. Halogenated aromatics will be used at 2 to 20 parts and synergists, e.g. antimony oxide, will be used at about 1 to 10 parts by weight per 100 parts of the resinous components.

Among the useful halogen-containing compounds are those of the formula:

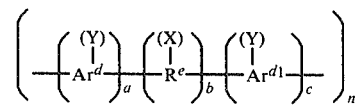

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether; carbonyl; amine; a sulfurcontaining linkage, e.g., sulfide, sulfoxide, sulfone; carbonate; a phosphorus-containing linkage, and the like. R can be derived from a dihydric phenol, e.g., bisphenol-A, or can be a carbonate linkage. Other groups which are represented by R will occur to those skilled in the art.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g. phenyl, nucleus.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a,b and c represent whole numbers including 0. When b is not 0, neither a nor c may be 0. Otherwise, either a or c, but not both, may be 0. Where the b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are diaromatics of which the following are representative:
2,2-bis(3,5-dichlorophenyl) propane
bis-(2,chlorophenyl) methane
bis-(2,6-dibromophenyl) methane
1,1-bis(4-iodophenyl) ethane
1,2-bis-(2,6-dichlorophenyl) ethane
1,1-bis(2-chloro-4-iodophenyl) ethane
1,1-bis-(2-chloro-4-methylphenyl) ethane
1,1-bis-(3,5-dichlorophenyl) ethane
2,2-bis-(3-phenyl-4-bromophenyl) ethane
2,3-bis-(4,6-dichloronaphthyl)-ethane
2,2-bis-(2,6-dichlorophenyl) pentane
2,2-bis-(3,5-dichromophenyl) hexane
bis-(4-chlorophenyl) phenylmethane
bis-(3,5-dichlorophenyl) cyclohexylmethane
bis-(3-nitro-4-bromophenyl) methane
bis-(4-hydroxy-2,6-dichloro-3-methoxyphenyl) methane
2,2-bis-(3,5-dichloro-4-hydroxyphenyl) propane
2,2-bis-(3-bromo-4-hydroxyphenyl) propane
2,2-bis-(3,5-dibromo-4-hydroxyphenyl) propane The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl ethers, containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Special mention is made of flame retardant additives consisting of aromatic carbonate homopolymers having repeating units of the formula:

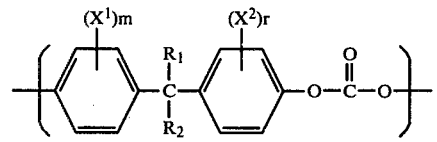

wherein $R^1$ and $R^2$ are hydrogen, (lower) alkyl or phenyl, $X^1$ and $X^2$ are bromo or chloro and m and r are from 1 to 4. These materials may be prepared by techniques well known to those skilled in the art. Also preferred are aromatic carbonate copolymers in which from 25 to 75 weight percent of the repeating units comprise chloro- or bromo-substituted dihydric phenol, glycol or dicarboxylic acid units. See, e.g., A. D. Wambach, U.S. Pat. No. 3,915,926.

An especially preferred flame retardant agent will comprise an aromatic carbonate copolymer of tetrabromobisphenol-A and bisphenol-A, preferably in a 50:50 ratio, in combination with an organic or inorganic antimony containing compound, e.g., antimony oxide, prepared as described in U.S. Pat. No. 3,915,926.

In general, the preferred phosphate compounds are selected from elemental phosphorus or organic phosphonic acids, phosphonates, phosphinates, phosphonites, phosphinites, phosphine oxides, phosphines, phosphites or phosphates illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula:

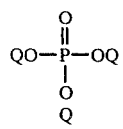

and nitrogen analogs thereof where each Q represents the same or different radicals including hydrocarbon radicals such as alkyl, cycloalkyl, aryl, alkyl substituted aryl and aryl substituted alkyl; halogen, hydrogen and combinations thereof provided that at least one of said Q's is aryl. Typical examples of suitable phosphates include, phenylbisdodecyl phosphate, phenylbisneopentyl phosphate, 2,ethylhexyl di-p-tolyl) phosphate, diphenyl hydrogen phosphate, phenylbis-(3,5,5-trimethylhexyl phosphate), ethyldiphenyl phosphate, 2-ethylhexy di(p-toly) phosphate, diphenyl hydrogen phosphate, bis (2-ethylhexyl)p-tolylphosphate, tritolyl phosphate, bis-(2-ethylhexyl)phenyl phosphate, tri(-nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis (2,2,5'-trimethylhexyl) phosphate, 2-ethylhexyldiphenyl phosphate, diphenyl hydrogen phosphate, and the like. The preferred phosphates are those where each Q is aryl. The most preferred phosphate is triphenyl phosphate. It is also preferred to use triphenyl phosphate in combination with hexabromobenzene and, optionally, antimony oxide.

Also, suitable as flame-retardant additives for this invention are compounds containing phosphorus-nitrogen bonds, such as phosphonitrilic chloride, phosphorus ester amides, phosphoric amides, phosphonic acid amides, phosphinic acid amides, tris(ariridinyl)-phosphine oxide or also tetrakis (hydroxymethyl) phosphonium chloride. These flame retardant additives are commercially available.

The blends may be formed by conventional techniques, that is by first dry mixing the components and, thereafter, melt blending the composition in an extruder.

The following procedures may be employed to prepare materials useful in the practice of the invention.

PROCEDURE A

In a round bottomed distillation flask is placed a mixture of 49 g (0.5 mole) of maleic anhydride and 0.7 moles of isopropyl alcohol. The mixture is stirred and gradually heated to 55°-60° C. and held at that temperature for one hour after the anhydride has dissolved. The excess alcohol is stripped off using a rotating flask evaporator to leave a near quantitative yield of the half ester of maleic acid.

PROCEDURE B

A copolymer of styrene and mono-isopropyl maleate was prepared by combining 60 mole percent of styrene with 40 mole percent of mono-isopropyl maleate in xylene to make a mixture of 60 wt % xylene and 40 wt % monomer. The mixture was stirred and heated to 140° C. After 6 hours at 140° C., a slight haze developed. The reaction was left to stir overnight at 140°-145° C. to produce a mixture having the consistency of petroleum jelly. The temperature was lowered to 60° C. and 700 mls of acetone was added to make a clear viscous solution of the copolymer. The xylene-acetone solution was precipitated by pouring the solution into a rapidly agitated (waring blender) solution of hexane. The white copolymer was collected on a Buchner funnel and dried in an oven at 100° C. The intrinsic viscosity is 0.41 deciliters/gram as measured in tetrahydrofuran at 30° C.

PROCEDURE C

A 50:50 styrene-maleic anhydride copolymer was prepared by solution polymerization of the monomers in a stirred resin pot at atmospheric pressure. The resin pot was charged with 206 g (2 moles) of styrene and 196 g (2 moles) maleic anhydride dissolved in 400 g toluene. The uncatalyzed, thermally initiated copolymerization was run by carefully heating the stirred solution to 85° C. where copolymerization was completed in 1.5 to 2 hours. The white copolymer which had separated from solution was collected, ground to a powder, extracted with fresh toluene at 60° C. and finally oven dried at 140° C. Yield was 355 g (88% of theory) copolymer having an IV of 0.67 dl/g in tetrohydrofuran at 30° C.

The half esters of this copolymer are prepared by heating the copolymer with an excess of the appropriate alcohol. As the reaction proceeds, the resin dissolves and there is obtained a 10–15 wt % solution of the half ester in the alcohol. The ease of reaction is a function of the alcohol employed. Primary alcohols may be reacted at atmospheric pressure, but secondary alcohols generally require reaction temperatures that are higher than the temperatures that can be achieved at atmospheric pressure.

The methyl half ester is prepared by heating 10 g of the 50:50 styrene maleic anhydride copolymer prepared hereinabove under reflux with 90 g of methanol. After 3.5 hours the resin had completely gone into solution. The reaction product is recovered by precipitation of the reaction mixture in water. The product was oven dried at 80° C. and was cast as a thin film from tetrahydrofuran. The infrared absorption spectrum showed reduced anhydride absorption peaks at 5.3 and 5.6 $\mu$ and it was estimated that 65 to 70% of the anhydride function had been converted to the half ester. A repeat reaction in which the time was extended to 7 hours at reflux gave a product in which 85–90% of the anhydride was reacted.

The ethyl half ester was similarly prepared by heating 10 g of the copolymer with ethanol at reflux for 6 hours. The infrared spectrum indicated that about 90% of the anhydride units were converted to the half ester.

The isopropyl half ester was prepared by heating a 10 g portion of the styrene maleic anhydride copolymer with 150 g of isopropanol at 125° C. under pressure for 4 hours. Infrared study of the product indicated that about 70% of the anhydride units had been converted to the isopropyl half ester. A repeat reaction at 170° C. for 6 hours produced a product in which > 95% conversion occurred.

The isobutyl half ester was prepared by heating a 10 g portion of styrene maleic anhydride in 120 g of isobutyl alcohol for 8 hours. The product was recovered by precipitating the clear, viscous solution with water and was found by infrared examination to be 60–65% converted to the half ester. A repeat reaction at 150° C. under pressure for 3 hours produced a product at > 95% conversion.

The secondary butyl half ester was prepared by heating the copolymer of styrene maleic anhydride and secondary butyl alcohol under pressure at 170° C. This reaction was estimated by infrared to yield 90% conversion after 5 hours.

The isoamyl half ester was prepared from 10 g of the copolymer of styrene maleic anhydride and 140 g of isoamyl alcohol. The mixture was refluxed for 8 hours and the product that was precipitated in water was found by infrared examination to have approximately 65-70% of the anhydride units converted to the half ester.

DESCRIPTION OF THE PREFERRED EMBODIMENT

The following examples illustrate the process of this invention. They are merely illustrative and are not to be construed to limit the invention in any manner whatsoever.

EXAMPLE 1

A concentrate containing 15 wt. % of a 60:40 copolymer of styrene-isopropyl maleate half ester and 85 wt % of a composition that contains 35 parts by weight of a poly (2,6-dimethyl -1,4-phenylene oxide)*; 65 parts by weight of a rubber-modified, high impact polystyrene containing about 8% polybutadiene rubber; 8 parts by weight of triphenylphosphate was prepared by extruding the ingredients through a one inch single screw extruder. The feed port was heated to 410° F. Maximum barrel temperature was 450° F. No frothing of the extruded strand was observed. The extruded strand was fed into a bath and was pelletized.
*Intrinsic viscosity of about 0.5 dl/g as measured in CHCl₃ at 30° C.

EXAMPLE 2

The pelletized concentrate of Example 1 was tumble blended with pellets of the poly (2,6-dimethyl-1,4-phenylene oxide) composition that was employed in Example 1 to prepare a composition that contains 3 wt % of the 60:40 copolymer of styrene-isopropyl maleate half ester. This composition was molded at a temperature of 560° F. to prepare test specimens. The test specimens have a density of about 0.8.

EXAMPLE 3

Two blends are prepared from the copolymer of styrene-isopropyl maleate and the poly (2,6-dimethyl-1,4-phenylene oxide) resin compositions that were employed in Example 1. These blends had the following composition:

|  | A (wt %) | B (wt %) |
|---|---|---|
| Copolymer of styrene-isopropyl maleate | 3 | 3 |
| Poly (2,6-dimethyl-1,4-phenylene oxide) composition | 97 | 96 |
| talc | 0 | 1 |
| Density | 0.8-0.9 | 0.8-0.9 |

Both compositions yielded a foam having a good cell structure.

EXAMPLE 4

Pellets of the composition of Example 1 were placed in a bath of hot silicone oil (dimethyl polysiloxane having a viscosity of 100 centistokes at 25° C.) and observations were made of the time required for the compositions to foam enough to rise to the surface of the oil bath.

| Time to Rise: | ∞ | 1.28min | 0.55min | 0.30min | 0.22min |
|---|---|---|---|---|---|
| Temp. of Oil: | 165° C. | 170° C. | 175° C. | 200° C. | 225° C. |

The temperature for foam molding of these compositions are somewhat higher than the foaming temperature in oil as the extrusion and molding procedures are carried out under pressure which tends to raise the foaming temperature.

EXAMPLE 5

Copolymers of styrene-maleic anhydride (50:50) were transformed into the half esters of various alcohols according to Procedure C and 15 parts by weight of these half esters were combined with 85 parts by weight of a composition of poly (2,6-dimethyl-1, 4-phenylene oxide) of rubber modified, high impact polystyrene. The samples were prepared by solution blending in chloroform, driving off the solvent and compressing the residue at 3000 psi and 140° C. Pellet size particles of the compressed samples were tested for foaming in hot silicone oil according to the procedure of Example 4.

I

Copolymer of styrene-maleic anhydride, methyl half ester.

| Time to Rise: | ∞ | 2.10min | 1.65min | 0.40min | 0.30min |
|---|---|---|---|---|---|
| Oil Temp.: | 170° C. | 175° C. | 180° C. | 190° C. | 200° C. |

II

Copolymer of styrene-maleic anhydride ethyl half ester.

| Time to Rise: | ∞ | 1.75min | 0.40min | 0.25min | 0.22min | 0.15min |
|---|---|---|---|---|---|---|
| Oil Temp.: | 155° C. | 160° C. | 165° C. | 170° C. | 175° C. | 200° C. |

III

Copolymer of styrene-maleic anhydride, isopropyl half ester.

| Time to Rise: | ∞ | 1.70min | 0.65min | 0.30min | 0.25min |
|---|---|---|---|---|---|
| Oil Temp.: | 160° C. | 165° C. | 170° C. | 175° C. | 200° C. |

IV

Copolymer of styrene-maleic anhydride, ethyl half ester in combination with a composition of 91 parts by weight of poly (2,6- dimethyl -1, 4-phenylene oxide) 9 parts by weight triphenylphosphate and 6 parts by weight of a hydrogenated block copolymer of styrene-butadiene styrene, (15-85 parts by weight).

| Time to Rise: | ∞ | 1.90min | 0.50min | 0.35min | 0.25min | 0.25min |

| -continued | | | | | | |
|---|---|---|---|---|---|---|
| Oil Temp.: | 155° C. | 160° C. | 165° C. | 170° C. | 175° C. | 200° C. |

The copolymer of 50:50 styrene-maleic anhydride, isopropyl half ester, (III) foams more readily than the 60:40 copolymer of Example 4. The ethyl half ester gives somewhat slower foaming in rubber modified, high impact polystyrene (IV) than in the poly (2,6-dimethyl -1,4- phenylene oxide) pellets (II).

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:

1. A foamable, thermoplastic composition which consists essentially of:
   (a) a polyphenylene oxide resin or a polyphenylene oxide resin and an alkenyl aromatic resin; and
   (b) a minor amount of a foaming agent which comprises a thermally unstable copolymer containing units of the formula:

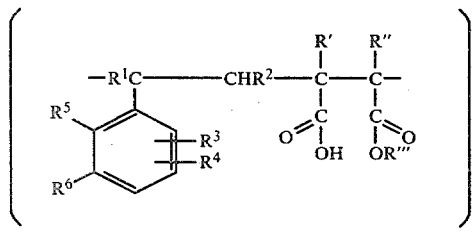

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and lower alkenyl groups of from 1 to 6 carbon atoms; or $R^5$ and $R^6$ may be concatenated together with hydrocarbyl groups to form a naphthyl group, said units being free of any substituent having a tertiary carbon atom; R' and R" are independently selected from the group consisting of hydrogen, lower alkyl of from 1 to 6 carbon atoms and phenyl; and R''' is lower alkyl of from 1 to 6 carbon atoms.

2. The composition of claim 1 wherein the polyphenylene ether resin is of the formula:

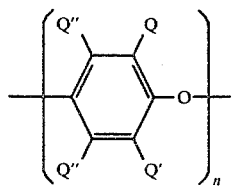

wherein Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is as defined for Q and in addition may be halogen and Q" are each as defined for Q' and in addition maybe hydrogen, with the proviso that Q, Q' and Q" are all free of a tertiary carbon atom; and n is at least 50.

3. The composition of claim 2 wherein the alkenyl aromatic resin has at least 25% of its units derived from a monomer of the formula:

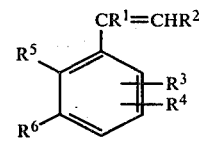

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and lower alkenyl groups of from 1 to 6 carbon atoms; or $R^5$ and $R^6$ may be concatenated together with hydrocarbyl groups to form a naphthyl group said compounds being free of any substituent that has a tertiary carbon atom.

4. The composition of claim 3 wherein the foaming agent is a half ester of a copolymer of styrene and maleic anhydride.

5. The composition of claim 4 which includes 5–80 parts by weight of a polyphenylene oxide resin; from 10–70 parts by weight of an alkenyl aromatic resin; and from 2–20 parts by weight of a half ester of a copolymer of styrene and maleic anhydride, based on the total weight of the composition.

6. A foamable thermoplastic composition which consists essentially of:
   (a) a polyphenylene oxide resin having units of the formula:

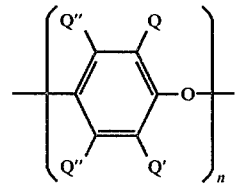

wherein Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' is as defined for Q and in addition may be halogen and Q" are each as defined for Q' and in addition may be hydrogen, with the proviso that Q, Q' and Q" are all free of a tertiary carbon atom; and n is at least 50;

(b) an alkenyl aromatic resin having at least 25% of its units derived from a monomer of the formula:

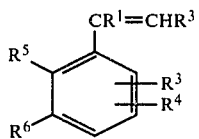

wherein $R^1$ and $R^2$ are selected from the group consisting of lower alkyl and lower alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said compounds being free of any substituent that has a tertiary carbon atom;

(c) a minor amount of a foaming agent which comprises a thermally unstable copolymer containing units of the formula:

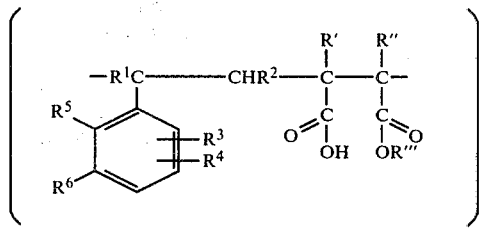

wherein $R^1$ and $R^2$ are selected from the group consisting of lower alkyl and alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and lower alkenyl groups of from 1 to 6 carbon atoms; or $R^5$ and $R^6$ may be concatenated together with hydrocarbyl groups to form a naphthyl group, said units being free of any substituent having a tertiary carbon atom; R' and R" are independently selected from the group consisting of lower alkyl of from 1 to 6 carbon atoms and phenyl; and R'" is lower alkyl of from 1 to 6 carbon atoms.

7. The composition of claim 6 which includes from 5-80 parts by weight of a polyphenylene oxide resin; from 10-70 parts by weight of an alkenyl aromatic resin; and from 2-20 parts by weight of the half ester of a copolymer of an alkenyl aromatic monomer and an unsaturated dicarboxylic acid anhydride, based on the total weight of the composition.

8. The composition of claim 7 wherein the polyphenylene oxide resin is poly (2,6- dimethyl -1,4- phenylene oxide).

9. The composition of claim 8 wherein the alkenyl aromatic resin is rubber modified, high impact polystyrene.

10. The composition of claim 9 wherein the thermally unstable foaming agent is the methyl, ethyl, isopropyl, isobutyl, secondary butyl or isoamyl half ester of a styrene maleic anhydride copolymer.

11. The composition of claim 1 wherein includes a reinforcing amount of a reinforcing filler.

12. The composition of claim 1 which includes a flame retardant amount of a flame retardant agent.

13. The composition of claim 11 which includes a flame retardant amount of a flame retardant agent.

14. A foam composition which has been produced by subjecting the composition as defined in claim 1 to a sufficient amount of heat to cause decomposition of at least a portion of the foaming agent.

15. A foamed composition which has been produced by subjecting the composition as defined in claim 6 to a sufficient amount of heat to cause decomposition of at least a portion of the foaming agent.

* * * * *